US009354335B2

(12) United States Patent
Chafe (10) Patent No.: US 9,354,335 B2
(45) Date of Patent: May 31, 2016

(54) DETERMINING LOCATION INFORMATION OF MICROSEISMIC EVENTS DURING HYDRAULIC FRACTURING

(71) Applicant: The Board of Trustees of the Leland Stanford Junior University, Palo Alto, CA (US)

(72) Inventor: Christopher D. Chafe, Palo Alto, CA (US)

(73) Assignee: THE BOARD OF TRUSTEES OF THE LELAND STANFORD JUNIOR UNIVERSITY, Palo Alto, CA (US)

( * ) Notice: Subject to any disclaimer, the term of this patent is extended or adjusted under 35 U.S.C. 154(b) by 431 days.

(21) Appl. No.: 13/919,915

(22) Filed: Jun. 17, 2013

(65) Prior Publication Data

US 2013/0343159 A1  Dec. 26, 2013

Related U.S. Application Data

(60) Provisional application No. 61/663,506, filed on Jun. 22, 2012.

(51) Int. Cl.
*G01V 1/00* (2006.01)
*G01V 1/18* (2006.01)
*G01V 1/40* (2006.01)

(52) U.S. Cl.
CPC ...... *G01V 1/181* (2013.01); *G01V 1/40* (2013.01); *G01V 2210/21* (2013.01)

(58) Field of Classification Search
CPC .......... G01V 1/008; G01V 1/181; G01V 1/40; G01V 2210/21
See application file for complete search history.

(56) References Cited

U.S. PATENT DOCUMENTS

| 4,884,247 | A | * | 11/1989 | Hadidi et al. | 367/43 |
| 5,917,160 | A | * | 6/1999 | Bailey | 181/112 |
| 5,929,795 | A | * | 7/1999 | Wang | 341/118 |
| 6,536,553 | B1 | * | 3/2003 | Scanlon | 181/108 |
| 2002/0011378 | A1 | * | 1/2002 | Bailey | 181/108 |
| 2003/0021183 | A1 | * | 1/2003 | Mueller-Dombois | 367/13 |
| 2005/0280519 | A1 | * | 12/2005 | Nagata | 340/435 |
| 2006/0001532 | A1 | * | 1/2006 | Nagata | 340/438 |
| 2007/0211574 | A1 | * | 9/2007 | Croft | 367/197 |
| 2013/0128694 | A1 | * | 5/2013 | Lacazette et al. | 367/27 |

* cited by examiner

*Primary Examiner* — Luke Ratcliffe
*Assistant Examiner* — Hovhannes Baghdasaryan
(74) *Attorney, Agent, or Firm* — Morgan, Lewis & Bockius LLP (57) ABSTRACT

A method of determining locations of microseismic events caused by a hydrofracking process is disclosed. The method includes: measuring audio signals using an array of geophones deployed in a monitoring well during hydraulic fracturing; modifying the audio signals according to a predefined nonlinear distortion operator to generate a modified audio signal, wherein the modified audio signal has audible components in a predefined frequency range beyond a cutoff frequency defined by a sampling rate of the respective measured audio signals; and playing the modified audio signals through a stereo or multi-channel speaker system, wherein a user of the stereo or multi-channel speaker system is able to determine the locations of the microseismic events from listening to the modified audio signals.

21 Claims, 12 Drawing Sheets

DETERMINING LOCATION INFORMATION OF MICROSEISMIC EVENTS DURING HYDRAULIC FRACTURING

RELATED APPLICATIONS

This application claims priority to U.S. Provisional Patent Application No. 61/663,506, filed Jun. 22, 2012, which is hereby incorporated by reference in its entirety.

TECHNICAL FIELD

The disclosed implementations relate generally to hydraulic fracturing, to system and method for determining location information of microseismic events during hydraulic fracturing.

BACKGROUND

Hydraulic fracturing (or hydrofracking) is a technique used for extracting fossil fuels such as oil and natural gas from reservoir rock formations by injecting highly-pressurized fluid into a rock layer from a wellbore. A hydraulic fracture is formed by pumping the fracturing fluid into the wellbore at a rate sufficient to increase pressure downhole to exceed that of the fracture gradient of the rock. When the rock starts cracking, the fracturing fluid continues farther into the rock, extending the crack still farther. A proppant material such as grains of sand, ceramic, or other particulates, is often introduced into the fracturing fluid, which prevents the fractures from closing when the injection is stopped. Research indicates that the extraction and recovery rates of fossil fuels from a hydrofracking zone relate to the location, size, and orientation of fractures in the rock formations. For example, fractures at certain locations or with certain orientations may provide a longer conductive path connecting a larger area of the reservoir to the wellbore, thereby increasing the area from which the fossil fuels can be recovered from the targeted formations.

SUMMARY

In accordance with some implementations described below, a method of processing an audio signal detected by a geophone placed in a well for monitoring hydraulic fracturing is disclosed. The method includes: receiving the audio signal, the audio signal comprising an audio signal detected by a geophone placed in a well for monitoring hydraulic fracturing; compressing a dynamic range of the audio signal in accordance with a predefined ratio; and modifying the compressed audio signal using a nonlinear distortion operator to generate a modified audio signal, wherein the modified audio signal has audible components in a predefined frequency range beyond a cutoff frequency defined by a sampling rate of the compressed audio signal.

In accordance with some implementations described below, a method of determining locations of microseismic events caused by a hydrofracking process is disclosed. The method includes: measuring audio signals using an array of geophones deployed in a monitoring well during hydraulic fracturing; modifying the audio signals according to a predefined nonlinear distortion operator to generate a modified audio signal, wherein the modified audio signal has audible components in predefined frequency range beyond a cutoff frequency defined by a sampling rate of the respective measured audio signals; and playing the modified audio signals through a stereo or multi-channel speaker system, wherein a user of the stereo or multi-channel speaker system is able to determine the locations of the microseismic events from listening to the modified audio signals.

In accordance with some implementations described below, a computer server system for determining locations of microseismic events caused by a hydrofracking process includes one or more processors; memory; and a plurality of program modules, wherein the plurality of program modules are stored in the memory and to be executed by the one or more processors. The plurality of program modules include instructions for: measuring audio signals using an array of geophones deployed in a monitoring well during hydraulic fracturing; modifying the audio signals according to a predefined nonlinear distortion operator to generate a modified audio signal, wherein the modified audio signal has audible components in a predefined frequency range beyond a cutoff frequency defined by a sampling rate of the respective measured audio signals; and playing the modified audio signals through a stereo or multi-channel speaker system, wherein a user of the stereo or multi-channel speaker system is able to determine the locations of the microseismic events from listening to the modified audio signals.

In accordance with some implementations described below, a non-transitory computer readable-storage medium storing one or more programs for execution by one or more processors of a computer server system for determining locations of microseismic events caused by a hydrofracking process. The one or more program modules comprise instructions for: measuring audio signals using an array of geophones deployed in a monitoring well during hydraulic fracturing; modifying the audio signals according to a predefined nonlinear distortion operator to generate a modified audio signal, wherein the modified audio signal has audible components in a predefined frequency range beyond a cutoff frequency defined by a sampling rate of the respective measured audio signals; and playing the modified audio signals through a stereo or multi-channel speaker system, wherein a user of the stereo or multi-channel speaker system is able to determine the locations of the microseismic events from listening to the modified audio signals.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

As noted above, the formation and propagation of fractures at desired locations in a rock layer may create more channels in the rock layer and increase the extraction and recovery rates of fossil fuels. By correlating such location information with the extracted amount of fossil fuels at the same time, it is possible to determine what type of fractures may produce more fossil fuels in terms of their spatial information such as orientation, location, size, etc. Based on the determination result, an operator can, at possibly real time, steer the hydrofracking system and pump more fracturing fluid in a direction, which may create more fuel-productive fractures.

The present application is directed to a method of determining the spatial information of the fractures by recording microseismic events caused by hydrofracking using an array of geophones deployed in a monitoring well and estimating a fracture's location from processing the geophone data corresponding to the microseismic events.

Figure 1:
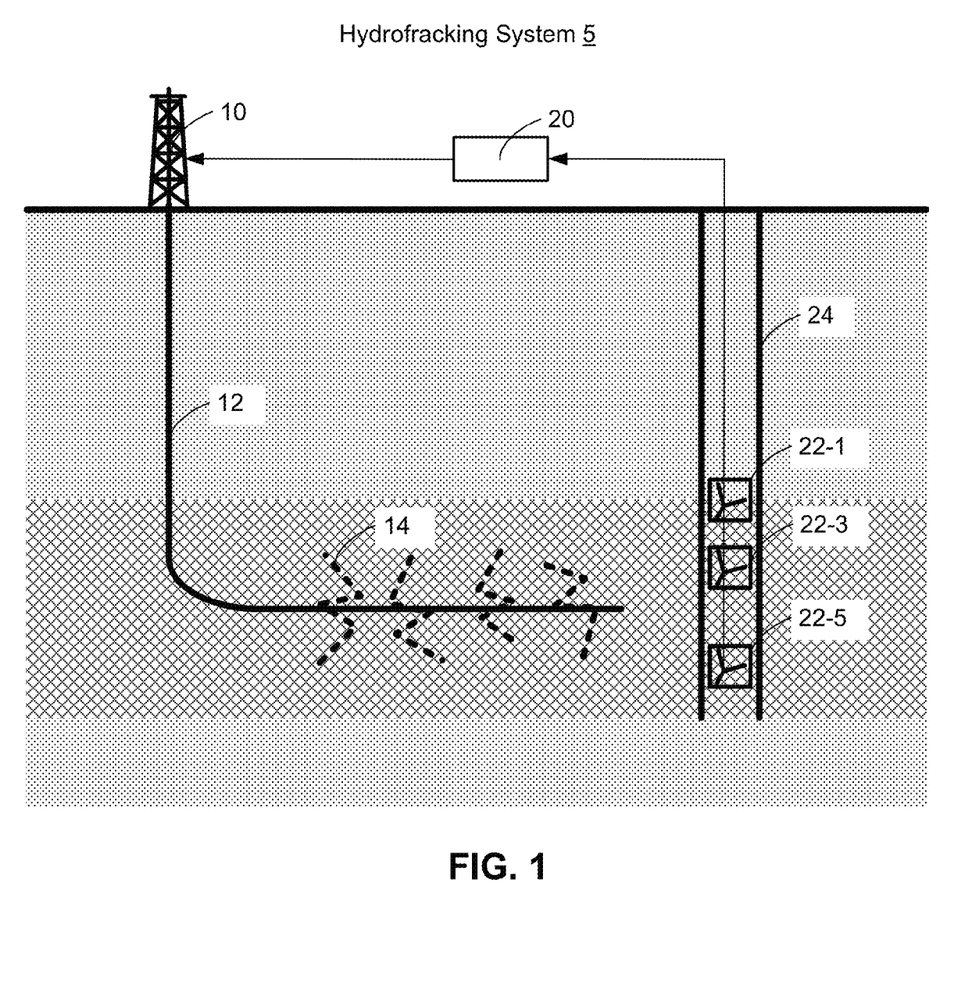
FIG. 1 is a block diagram illustrating a configuration of monitoring hydrofracking using geophones placed in a monitoring well in real time and steering the hydrofracking from interpreting the geophone data in accordance with some embodiments.

FIG. 1 is a block diagram illustrating a configuration of monitoring hydrofracking using geophones placed in a monitoring well in real time and steering the hydrofracking from interpreting the geophone data in accordance with some embodiments. The hydrofracking system 5 includes the borehole drilling equipment 10 and the monitoring system 20. The borehole drilling equipment 10 is responsible for controlling the drill bit (not shown) to traverse through different formation layers and forming a borehole 12 in the underground earth. Note that the borehole can be oriented in any direction, from vertical to horizontal. In this example, the horizontal portion of the borehole 12 passes through a hydrofracking zone and fracking fluid is introduced into the hydrofracking zone and produces multiple cracks therein as represented by the dashed lines 14. A monitoring well 24 is located adjacent the borehole and multiple geophones (22-1, 22-3, 22-5) are deployed within the monitoring well 24 to detect the microseismic events caused by the formation/expansion of rock cracks in the hydrofracking zone. A geophone is configured to collect seismic waves in one or more multiple directions. In this example, each geophone 22 can collect the seismic waves in three orthogonal directions. The collected seismic wave signals are transmitted to the monitoring system 20 on the surface. As will be described below in more detail, the monitoring system 20 processes the seismic wave signals and plays them to an operator of the hydrofracking system 5 in the form of audio signals.

From listening to the audio signals, e.g., using a pair of stereo headphones, the operator can estimate the spatial locations of the microseismic events, which correspond to the locations of the rock cracks in the formation layer. Based on the spatial distribution of the rock cracks in the formation layer, the operator may control the borehole drilling equipment 10 to steer the drill bit in the direction that may induce more rock cracks and therefore produce more natural gas. Note that the seismic wave signals may be processed at the site of the natural gas field or remotely at a data processing center. The seismic wave signals may be processed in real time or offline. Sometimes, the processing result may be mapped to a 3-D graphic model to visualize the locations of the rock cracks in the earth. It is further noted that FIG. 1 is for illustrative purpose only and the equipment in the figure is not necessarily depicted in the same scale as the real one.

Figure 2A:
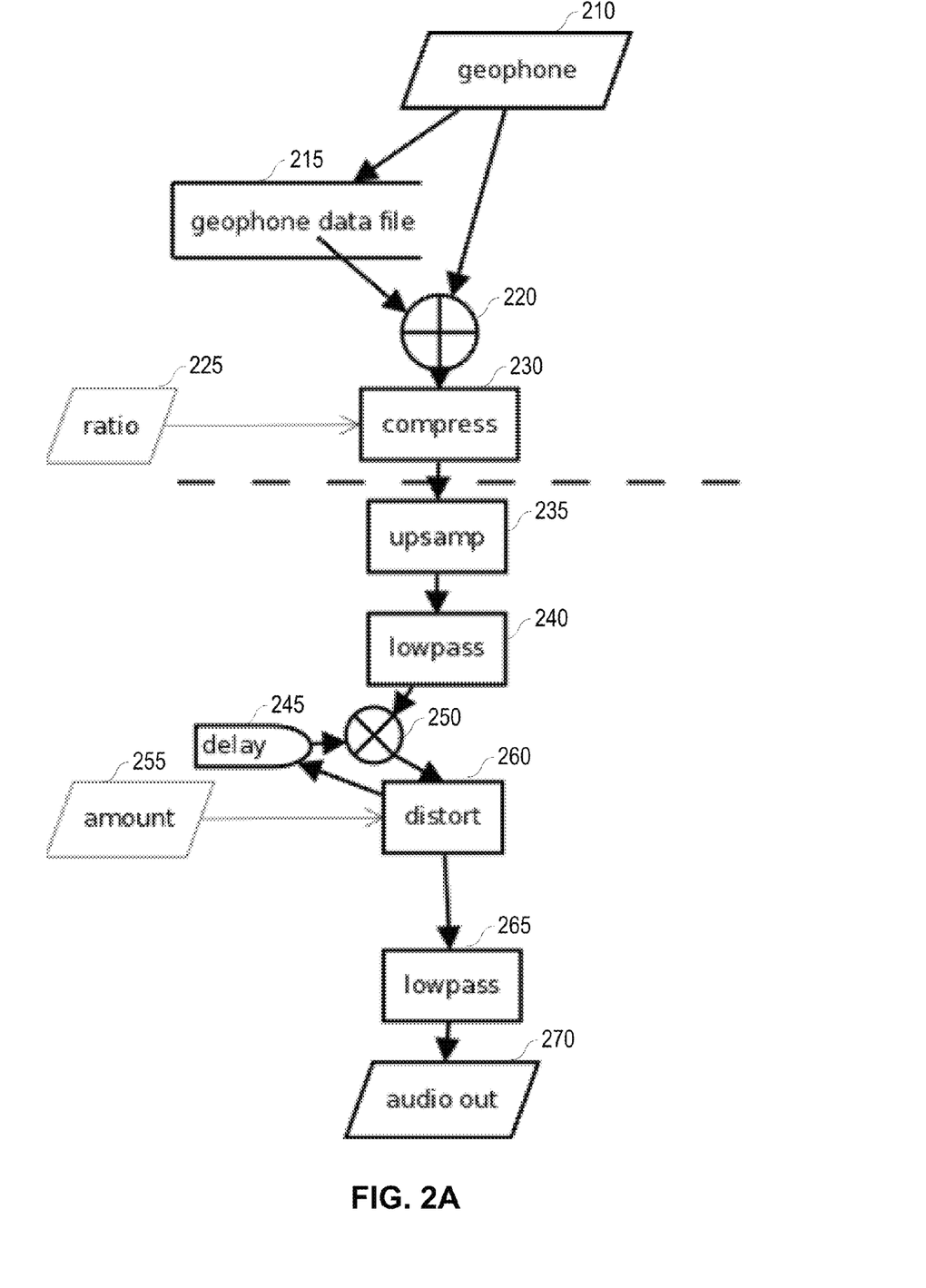
FIG. 2A is a flow chart illustrating a process of identifying the location of microseismic events from the geophone data in accordance with some embodiments.

FIG. 2A is a flow chart illustrating a process of identifying the location of microseismic events from the geophone data in accordance with some embodiments. In some embodiments (represented by the numeral 210 in FIG. 2A), the geophone data is collected and then processed by the monitoring system 20 on the site in real time. In some other embodiments (represented by the numeral 215 in FIG. 2A), the geophone data is first recorded in the form of geophone data files and stored in a storage device (e.g., a hard drive disk) and then brought to a data processing center for further processing.

Figure 2B:
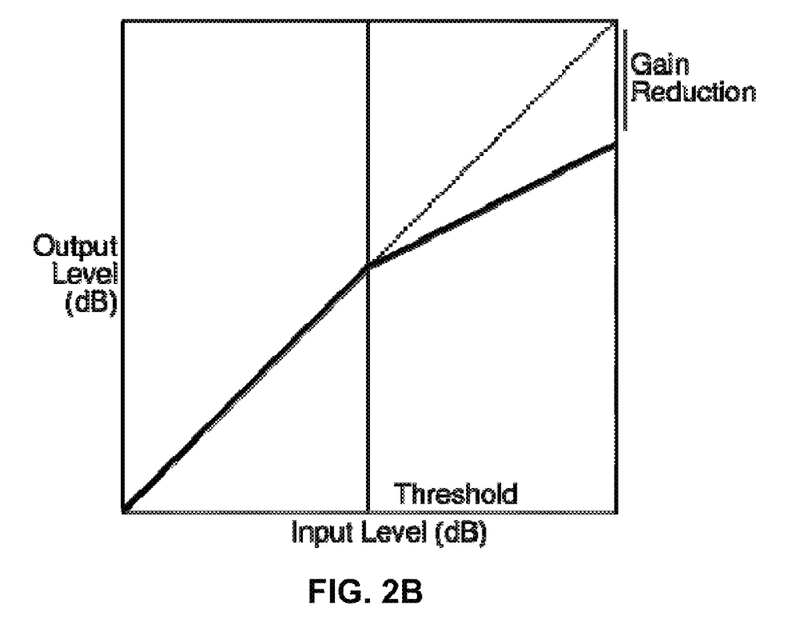
FIG. 2B depicts a downward dynamic range compression scheme in accordance with some embodiments.
Figure 2C:
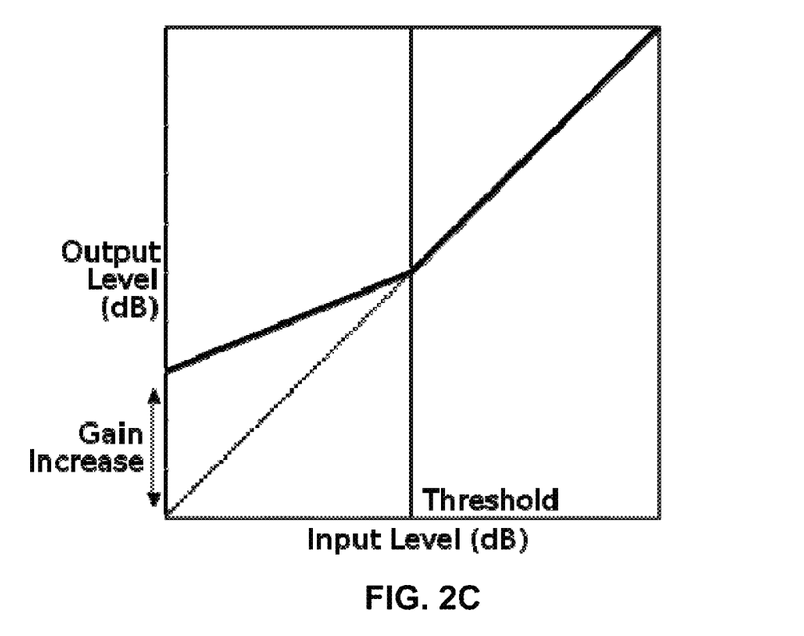
FIG. 2C depicts an upward dynamic range compression scheme in accordance with some embodiments.

The original geophone data has a relatively broad dynamic range. Signals corresponding to the microseismic events caused by the hydrofracking activities, which usually have relatively small amplitude, are often buried within the original geophone data and therefore difficult to detect. As a result, a pre-processing procedure such as dynamic range compression is often employed to compress (230) the dynamic range of the original geophone data. Dynamic range compression is a technique for reducing the volume of loud sounds or amplifying quiet sounds (such as the microseismic events) by narrowing or "compressing" an audio signal's dynamic range, which can be performed by dedicated electronic hardware unit or audio software called a "compressor." Two types of dynamic range compression are commonly used in the audio signal processing: (i) downward compression, which reduces loud sounds over a certain threshold while quiet sounds remain unaffected; and (ii) upward compression, which increases the loudness of sounds below a threshold while leaving louder passages unchanged. Both downward and upward compression can effectively reduce the dynamic range of the geophone data. For illustrative purposes, an exemplary downward dynamic range compression scheme and an exemplary upward dynamic range compression scheme are depicted in FIGS. 2B and 2C, respectively.

Currently, the geophone data are sampled (210) at a relatively low rate, e.g., a rate in the 2 kHz to 8 kHz range (e.g., 4 kHz). Audio signals with such a low sample rate sounds poorly (e.g., like a bad telephone connection) when played on the audio equipment (e.g., stereo headphone). As such, it is difficult for anybody to identify the spatial location information of the microseismic events even after the dynamic range compression. In order to solve this problem, the geophone data is first upsampled (235) from the original sample rate to a higher sample rate. There are many data upsampling schemes known to those skilled in the art, such as upsampling by integer factor that adds (L−1) zeros between two samples where L denotes the upsampling factor or performing linear interpolation between two samples. For illustrative purposes, an upsampling scheme based on the linear interpolation is employed in this application to upsample the geophone data from 4 kHz to 48 kHz (and more generally to a sample rate in the 20 kHz to 100 kHz range), while preserving the data's time base. In the example of upsampling from 4 kHz to 48 kHz, the data sampling period reduces from 0.25 ms to 0.021 ms.

Note that the upsampling operation (235) may introduce aliasing artifact into the upsampled geophone data. The upsampled data is further processed by a low-pass filter (240) to prevent the alias artifact from distorting the resulting data. Many well-known low-pass filters can be used for this purpose. In this application, a second-order Butterworth low-pass filter is employed to eliminate the alias artifacts from the upsampled geophone data. After the upsampling and low-pass filtering, the resulting geophone data may still not be played to an operator of the hydrofracking system using the audio equipment because the volume of the signals corresponding to the microseismic events is often too low to be uniquely captured by the operator's ears. In some embodiments, a nonlinear distortion procedure is used to further enhance the signals corresponding to the microseismic events in the geophone data.

As shown in FIG. 2A, the exemplary nonlinear distortion procedure includes a feedback process that generates modified audio signals within a predefined frequency range (e.g., a frequency range corresponding to the human hearing range, a frequency range corresponding to signals audible to humans) by processing the geophone data using a nonlinear dynamic equation. In some embodiments, the audio signals within the predefined frequency range (e.g., 2 KHz to 20 KHz) are still within the hearing range of ordinary human listeners but beyond the sampling cutoff frequency (e.g., 2 KHz) of the original geophone data. In some embodiments, the cutoff frequency is the Nyquist frequency corresponding to the sampling rate. In some embodiments, the audio signals within the predefined frequency range are chosen such that they correspond to the microseismic events within the geophone data and can provide spatial information of the events. For illustrative purposes, a nonlinear dynamic equation based on the logistic map is used for "composing" the geophone data to "promote" the signals corresponding to the microseismic events as follows:

$$x_{n+1} = r(x_n + d_n)(1 - (x_n + d_n))$$

wherein:
  r=3.4 (where r represents a distortion parameter);
  n=0, 1, 2, . . . ;
  $x_0$=0; and
  $d_n$ represents the normalized geophone data within the range of (−1, 1); and
  $x_n$ represents the composed geophone data and the output of the distortion procedure.

In this example, the sum (250) of a normalized geophone data sample (240) and a delayed output data sample (245) is subject to a nonlinear distortion procedure (260), e.g., the logistic map, which has a distortion parameter (255). The output of the distortion procedure (260) is delayed again by one sample and then summed (250) together with the next data sample of the geophone data as the next input of the distortion procedure. At the end of this iterative process, the distortion procedure outputs a new time sequence of data samples corresponding to the geophone data after being modified by the logistic map. As will be described below, the time sequence is configured by the distortion procedure such that the signals corresponding to the potential microseismic events are "elevated" relative to the other signals. Next, the time sequence of data samples is low-passed (265) by another low-pass filter to eliminate the undesired high-frequency components from the time sequence before the time sequence is played (270) as an audio output signal through the audio equipment. In some embodiments, this low-pass filter is a second-order Butterworth low-pass filter that has a cutoff frequency determined by a sampling rate of the audio signal after the linear interpolation. When listening to the audio output signal, the operator of the hydrofracking system 5 can estimate the spatial locations of the rock cracks caused by hydrofracking in the underground earth and steer the drill bit accordingly. It should be noted that the logistic map is shown for illustrative purposes and there are other dynamic equations such as Hénon map or the like that can be used to substitute the logistic map and achieve similar results.

Figure 3:
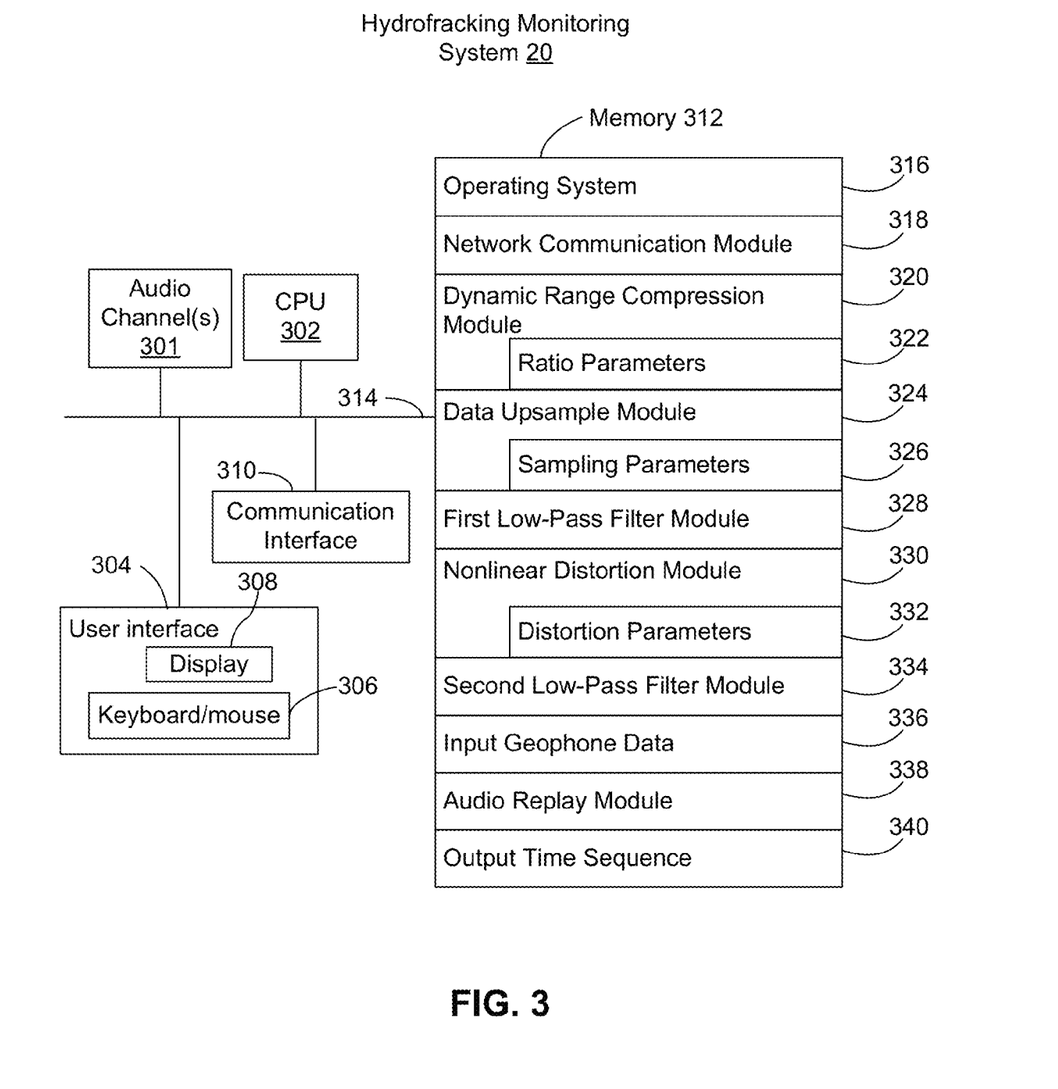
FIG. 3 is a block diagram illustrating the components of a hydrofracking monitoring system in accordance with some embodiments.

FIG. 3 is a block diagram illustrating the components of a hydrofracking monitoring system 20 in accordance with some embodiments. The hydrofracking monitoring system 20 includes one or more processing units (CPU's) 302 for executing modules, programs and/or instructions stored in memory 312 and thereby performing processing operations; one or more network or other communications interfaces 310; memory 312; and one or more communication buses 314 for interconnecting these components. In some embodiments, the hydrofracking monitoring system 20 includes a user interface 304 comprising a display device 308 and one or more input devices 306 (e.g., keyboard or mouse). In some embodiments, the hydrofracking monitoring system 20 includes one or more audio channels 301 through which the time sequence resulting from processing the geophone data using the hydrofracking monitoring system 20 is played to an operator of the hydrofracking equipment in the form of audio signals. In some embodiments, the memory 312 includes high-speed random access memory, such as DRAM, SRAM, DDR RAM or other random access solid state memory devices. In some embodiments, the memory 312 includes non-volatile memory, such as one or more magnetic disk storage devices, optical disk storage devices, flash memory devices, or other non-volatile solid state storage devices. In some embodiments, the memory 312 includes one or more storage devices remotely located from the CPU(s) 302. Memory 312, or alternately the non-volatile memory device(s) within memory 312, comprises a non-transitory computer readable storage medium. In some embodiments, memory 312 or the computer readable storage medium of memory 312 stores the following programs, modules and data structures, or a subset thereof, and may also include additional elements:

an operating system 316 that includes procedures for handling various basic system operations and for performing hardware dependent tasks;
  a network communications module 318 that is used for connecting the hydrofracking monitoring system 20 to other components (e.g., the geophones 22 in the monitoring well 24 of FIG. 1 or the audio replay equipment such as stereo headphones) via the communication network interfaces 310 and one or more communication networks (wired or wireless), such as the Internet, other wide area networks, local area networks, metropolitan area networks, and so on;
  a dynamic range compression module 320 for adjusting the dynamic range of the input geophone data 336 using the dynamic ratio parameters 322 so as to reduce the volume of loud audio signals or amplifies quiet audio signals in the input geophone data 336;
  a data upsampling module 324 for re-sampling the input geophone data 336 from a low rate (e.g., 4 kHz) to a high rate (e.g., 48 kHz) using the sampling parameters 326 while preserving the time base of the geophone data 336;
  a first low-pass filter module 328 (e.g., a second-order Butterworth low-pass filter) for low-pass filtering the upsampled geophone data so as to remove the potential aliasing artifacts from the upsampled geophone data;
  a nonlinear distortion module 330 for introducing audio signals within a predefined frequency range into the geophone data based on a nonlinear dynamic equation such as the logistic map or Hénon map and one or more distortion parameters 332 associated with the nonlinear dynamic equation and generating a time sequence corresponding to the original input geophone data 336;
  a second low-pass filter module 334 for low-pass filtering the time sequence, i.e., the output of the nonlinear distortion module 330, so as to generate an output time sequence 340 with the undesired high-frequency components being removed; and an audio replay module 338 for converting the output time sequence 340 into one or more audio signals to be output through the audio channels 301.

As noted above, the hydrofracking monitoring system 20 may be deployed at or near a hydrofracking product site and an operator can steer the hydrofracking equipment in a direction that may produce more rock cracks from listening to the output time sequence 340 through a pair of stereo headphones. For example, the hydrofracking monitoring system 20 may generate an x-direction time sequence corresponding to the x-component of a geophone and a y-direction time sequence corresponding to the x-component of the geophone. When the two time sequences are played at two loudspeakers near the operator's two ears simultaneously, the operator can estimate the spatial location of the rock cracks in at least an x-y plane. In some embodiments, the output data from other geophones along the vertical string or the z-component of the same geophone as shown in FIG. 1 are used by the monitoring system 20 to generate another z-direction time sequence for driving another loudspeaker oriented vertically in relation to the other two loudspeakers so that the operator can get a more accurate estimate of the cracks' spatial locations in a 3-D space. In some other embodiments, the z-direction time sequence can be combined with the x-direction and y-direction time sequences into one pair of stereo headphones based on the so-called "binaural encoding."

In some other embodiments, the hydrofracking monitoring system 20 may be located at a data processing center remote from the hydrofracking site. Operators at the data processing center can not only play the output time sequences using audio equipment but also use a software application to develop a 3-D map of the rock cracks based on the spatial information offered by the time sequences. It should be noted that the location of the hydrofracking monitoring system 20 is not a determination factor whether the operator can steer the hydrofracking drill bit in a real-time fashion or whether the operator can generate a 3-D map of the rock cracks distribution in the underground earth. In other words, the operator working from a remote site can still steer the drill bit in real time based on the output of the hydrofracking monitoring system 20. Similarly, the operator can generate a 3-D map at the hydrofracking production site as well if necessary.

Figure 4A:
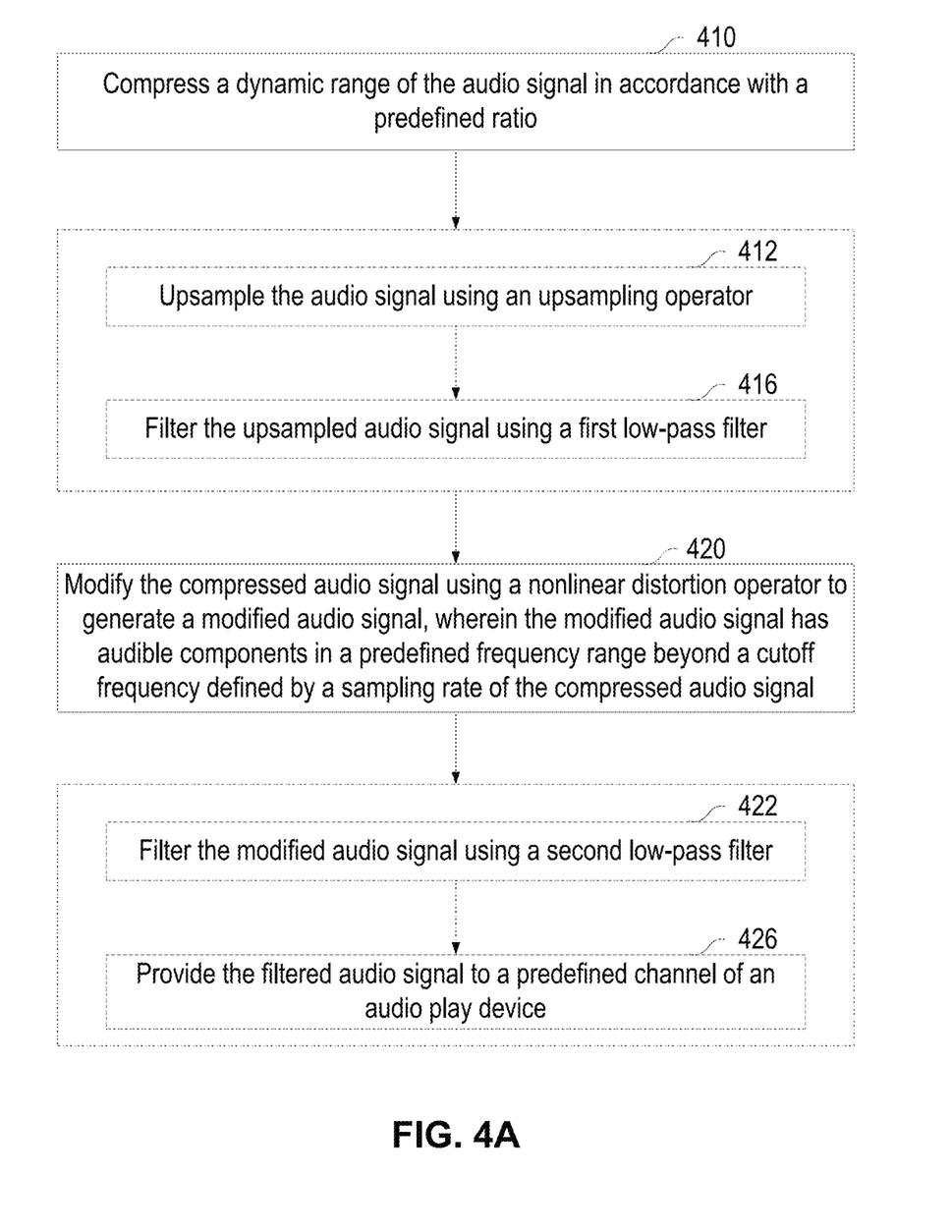
FIGS. 4A and 4B illustrate exemplary processes by a hydrofracking monitoring system for determining the location of microseismic events from the geophone data in accordance with some embodiments.
Figure 4B:
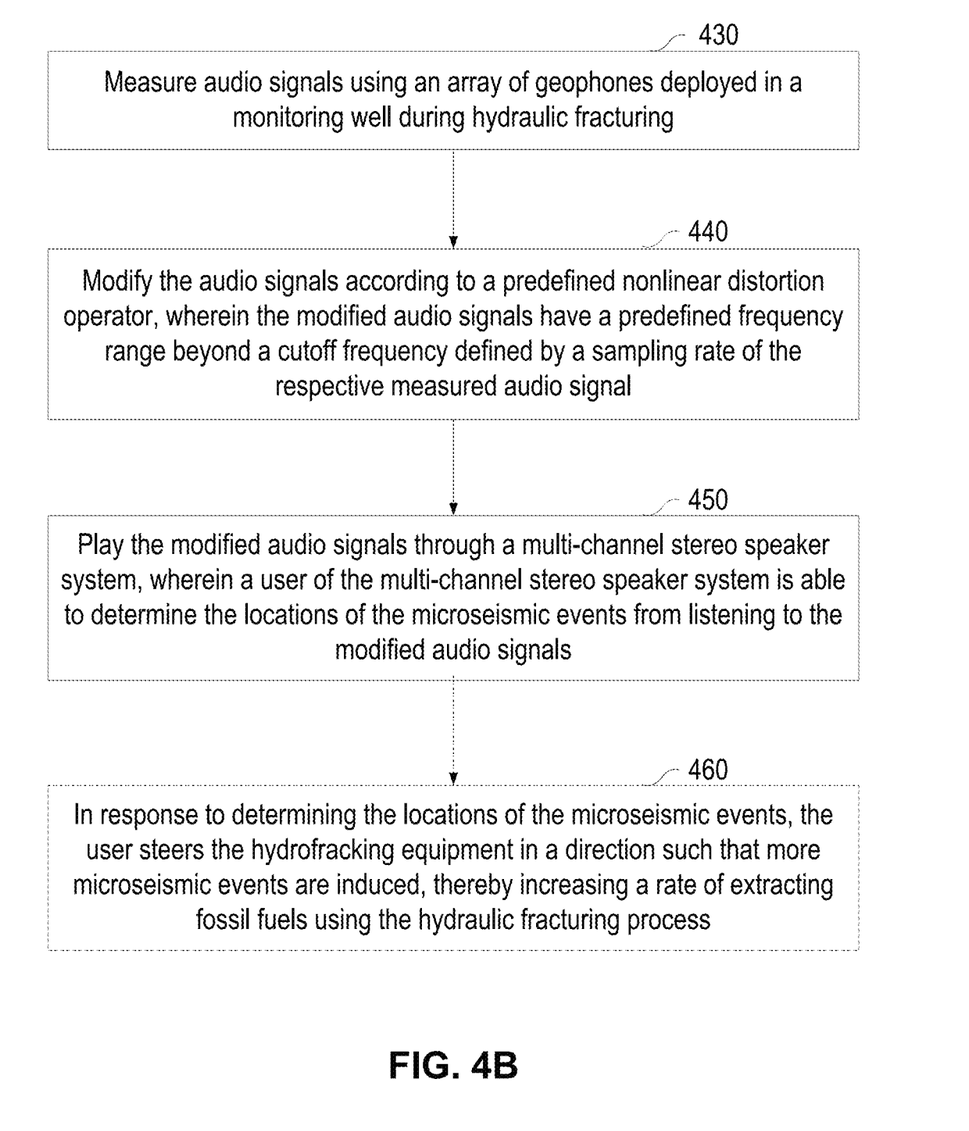

FIGS. 4A and 4B illustrate exemplary processes performed by a hydrofracking monitoring system for determining the location of microseismic events from the geophone data in accordance with some embodiments. As shown in FIG. 4A, after receiving the geophone data, the hydrofracking monitoring system compresses (410) the dynamic range of an audio signal represented by the geophone data in accordance with a predefined ratio. More details about the dynamic range compression have been described above in connection with FIG. 2B. Next, the hydrofracking monitoring system modifies (420) the compressed audio signal using a nonlinear distortion operator to generate a modified audio signal, such that the modified audio signal has audible components in a predefined frequency range (e.g., a frequency range corresponding to signals audible to human listeners) beyond a cutoff frequency defined by a sampling rate of the compressed audio signal. As described above in connection with FIG. 2A, one of the exemplary nonlinear distortion operators is defined by the logistic map and each data sample of the compressed audio signal is summed together with the output of the logistic map during the immediate pervious iteration as the input of the logistic map for the next iteration. Audio signals modified by the nonlinear distortion operator include audible components beyond the sampling cutoff frequency of the original geophone data such that they can be easily distinguished from the rest of the geophone data to "amplify" the audio signals corresponding to the microseismic events within the geophone data.

In some embodiments, before modifying the compressed audio signal, the hydrofracking monitoring system upsamples (412) the compressed audio signal using an upsampling operator and then filters (416) the upsampled audio signal using a first low-pass filter. As described above, one exemplary upsampling operator is defined by linear interpolation of the data samples in the input geophone data and the data sampling rate increases from 4 kHz to 48 kHz. One purpose of applying the first low-pass filter to the geophone data is to at least reduce potential aliasing artifacts from the geophone data, which may be caused by the upsampling operation. For example, a second-order Butterworth low-pass filter can be used for reducing the aliasing artifacts.

In some embodiments, after modifying the compressed audio signal, the hydrofracking monitoring system filters (422) the modified audio signal using a first low-pass filter and then provides (426) the filtered audio signal to a predefined channel of an audio play device. For example, the modified audio signal, which corresponds to the x-component of a geophone data, is fed into the left channel of a pair of stereo headphones to be played out to an operator of the hydrofracking equipment in real time. The operator, based on listening to the modified audio signal, can estimate the spatial locations of the rock cracks caused by the hydrofracking equipment and then steer the equipment in a direction that can cause more rock cracks and therefore increase the natural gas recovery rate at the hydrofracking production site.

FIG. 4B depicts another flow chart illustrating how the hydrofracking monitoring system operates. First, the hydrofracking monitoring system measures (430) audio signals using an array of geophones deployed in a monitoring well during hydraulic fracturing. An exemplary configuration of this measurement process is described above in connection with FIG. 1. Next, the hydrofracking monitoring system modifies (440) the audio signals according to a predefined nonlinear operator. In some embodiments, the modified audio signal has audible components in a predefined frequency range beyond a cutoff frequency defined by a sampling rate of the respective measured audio signal. Exemplary distortion operators such as the logistic map have been described above in connection with FIG. 2A. The hydrofracking monitoring system then plays (450) the modified audio signals through a mono, stereo or multi-channel speaker system or a pair of stereo headphones, optionally enhanced with, e.g., binaural or other 3D simulation. From listening to the modified audio signals, a user of the speaker system can determine the locations of the microseismic events carried in the audio signals. In some embodiments, the hydrofracking monitoring system can also generate a 3-D map using the modified audio signals, which depicts the distribution of the rock cracks in a formation layer of the underground earth in a more intuitive manner. In some embodiments, the listener of the modified audio signals is also responsible for operating the hydrofracking equipment. In response to determining the locations of the microseismic events, the user steers (460) the hydrofracking equipment in a direction such that more rock cracks are induced, thereby increasing a rate of extracting fossil fuels using the hydrofracking process.

Figure 5A:
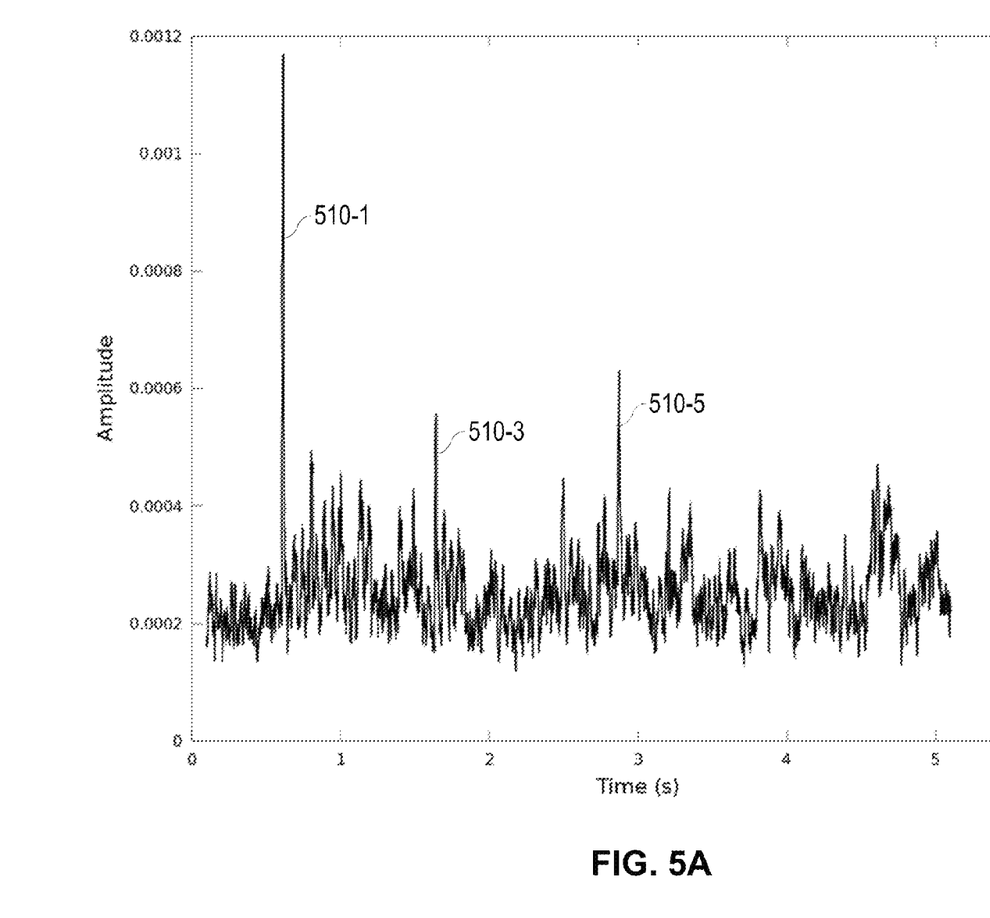
FIGS. 5A through 5F illustrate an example of processing the geophone data for identification of microseismic events in the geophone data in accordance with some embodiments.
Figure 5B:
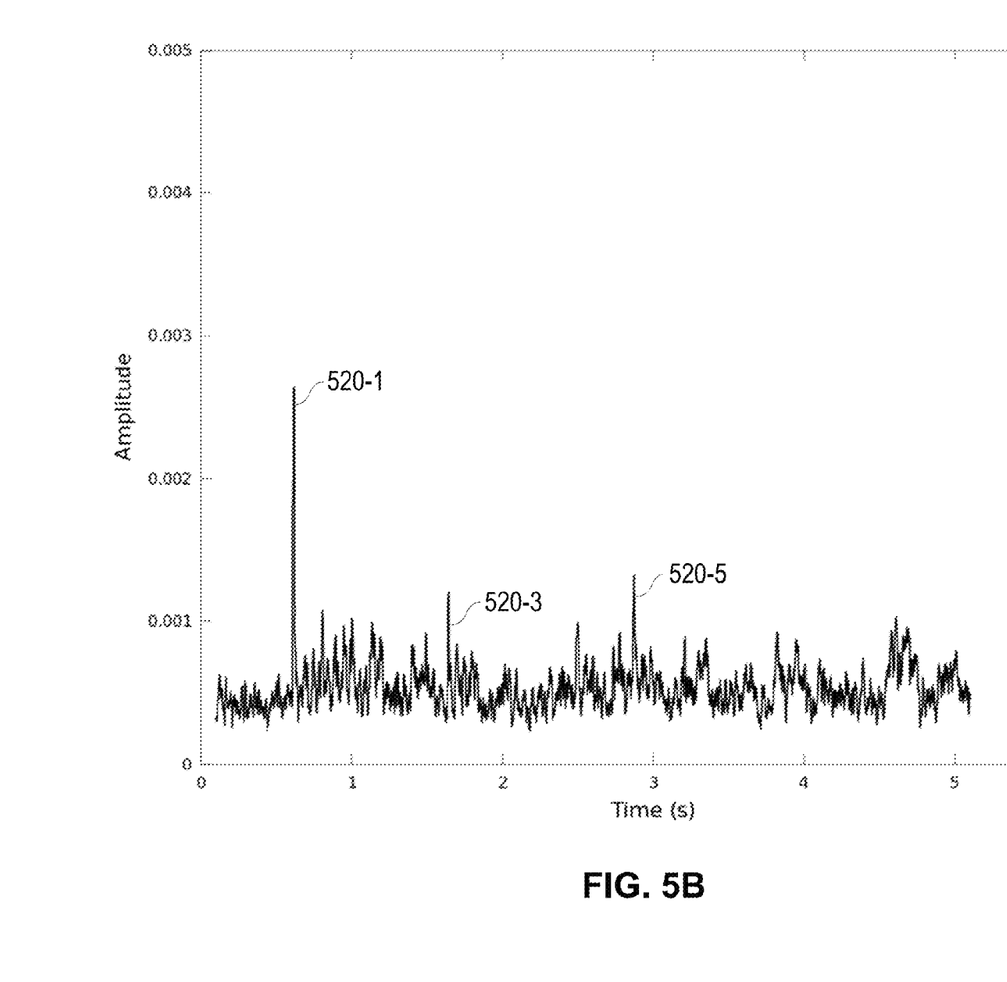
Figure 5C:
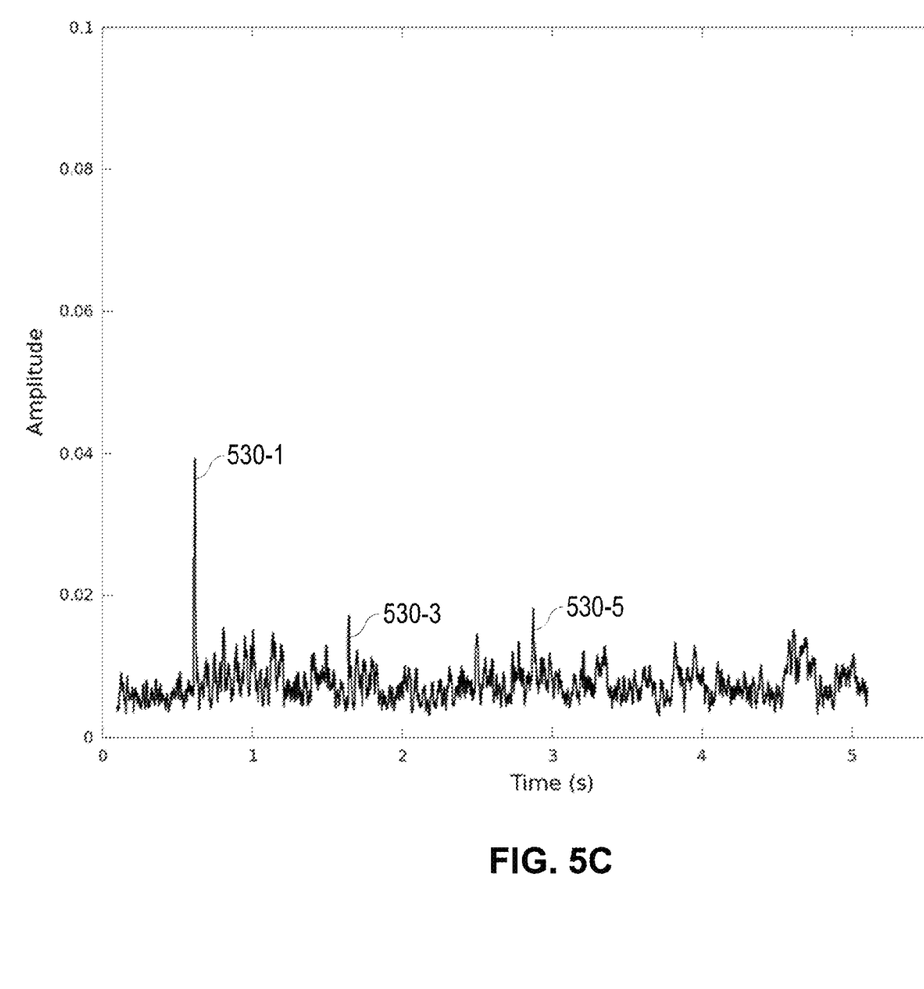
Figure 5D:
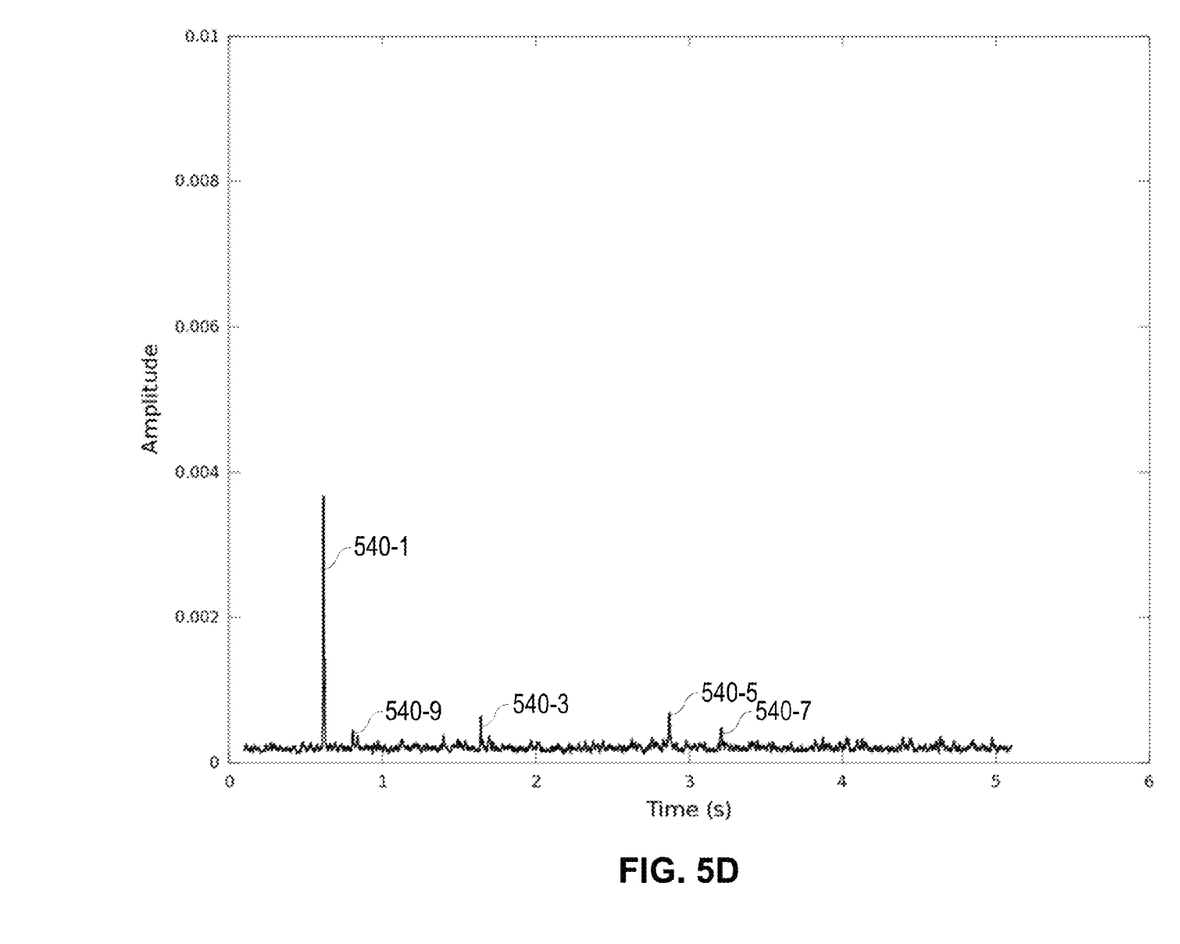
Figure 5E:
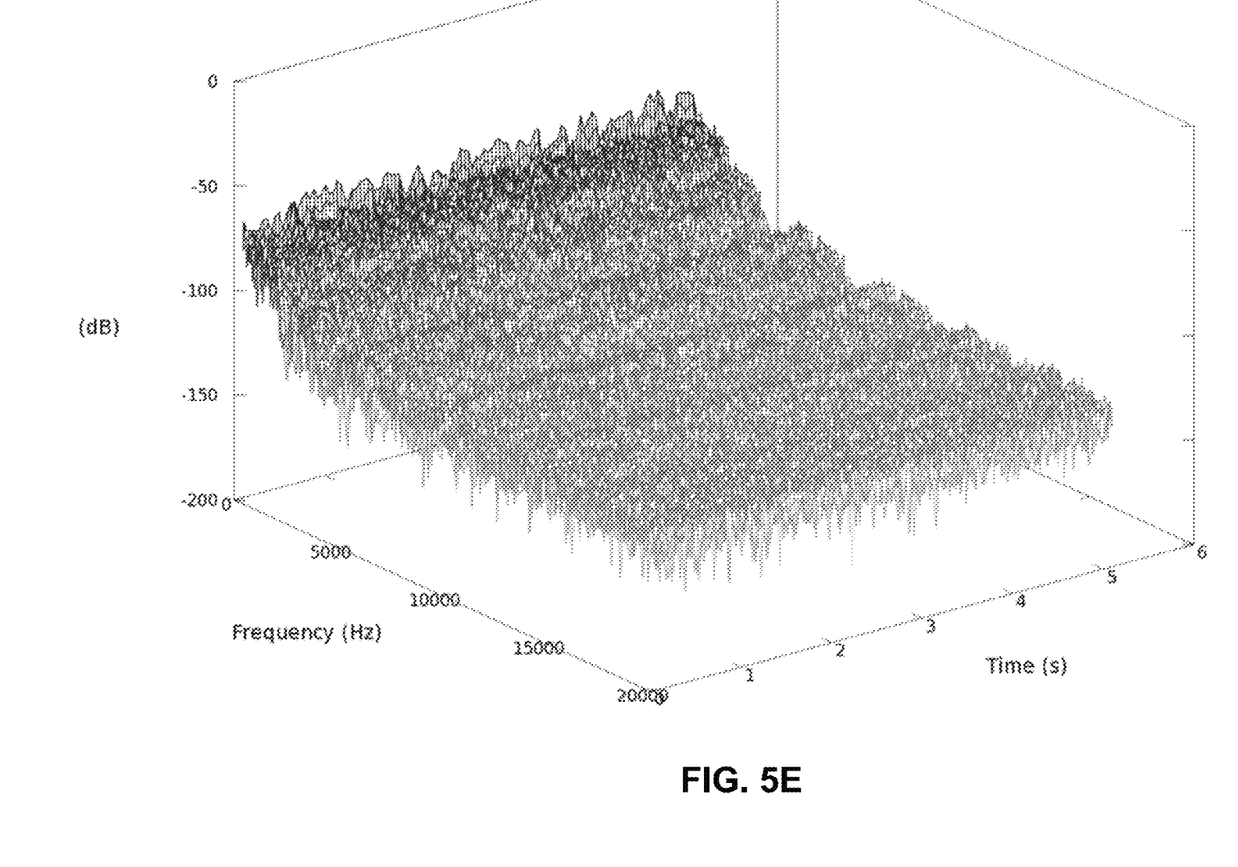

Finally, FIGS. 5A through 5F illustrate an example of processing the geophone data for identification of microseismic events in the geophone data in accordance with some embodiments. FIG. 5A depicts a 5-second segment of raw audio signal captured by a particular component of a geophone. The raw audio signal includes three spike-like amplitude jumps 510-1, 510-3, and 510-5 at three different moments along the time axis. But except for these three, it is probably difficult to tell where the other less visible potential microseismic events caused by rock cracks are in the 5-second audio signal. FIG. 5E is a 3-D spectrogram of the raw audio signal after applying the short-time Fourier transform (STFT) to the audio signal. As shown in the figure, the audio signal has few (if any) high-frequency components beyond the cutoff frequency defined by the geophone's sampling rate (e.g., 4 ms). But none of the three time-domain spikes identified in FIG. 5A correspond to noticeable or unique frequency characteristics in the spectrogram.

FIG. 5B illustrates the same 5-second audio signal after applying the dynamic range compression to the raw audio signal shown in FIG. 5A. As described above, this dynamic range compression is to increase the volume of the quiet sounds relative to the loud sounds in the audio signal. The three spikes 520-1, 520-3, and 520-5 in FIG. 5B correspond to the three spikes shown in FIG. 5A, respectively. But there is no significant improvement of the "resolution" of microseismic events in the audio signal after dynamic range compression.

FIG. 5C illustrates the same 5-second audio signal after applying upsampling and low-pass filtering to the compressed audio signal shown in FIG. 5B. Still, the three spikes 530-1, 530-3, and 530-5 in FIG. 5C correspond to the three spikes shown in FIGS. 5A and 5B, respectively.

Figure 5F:
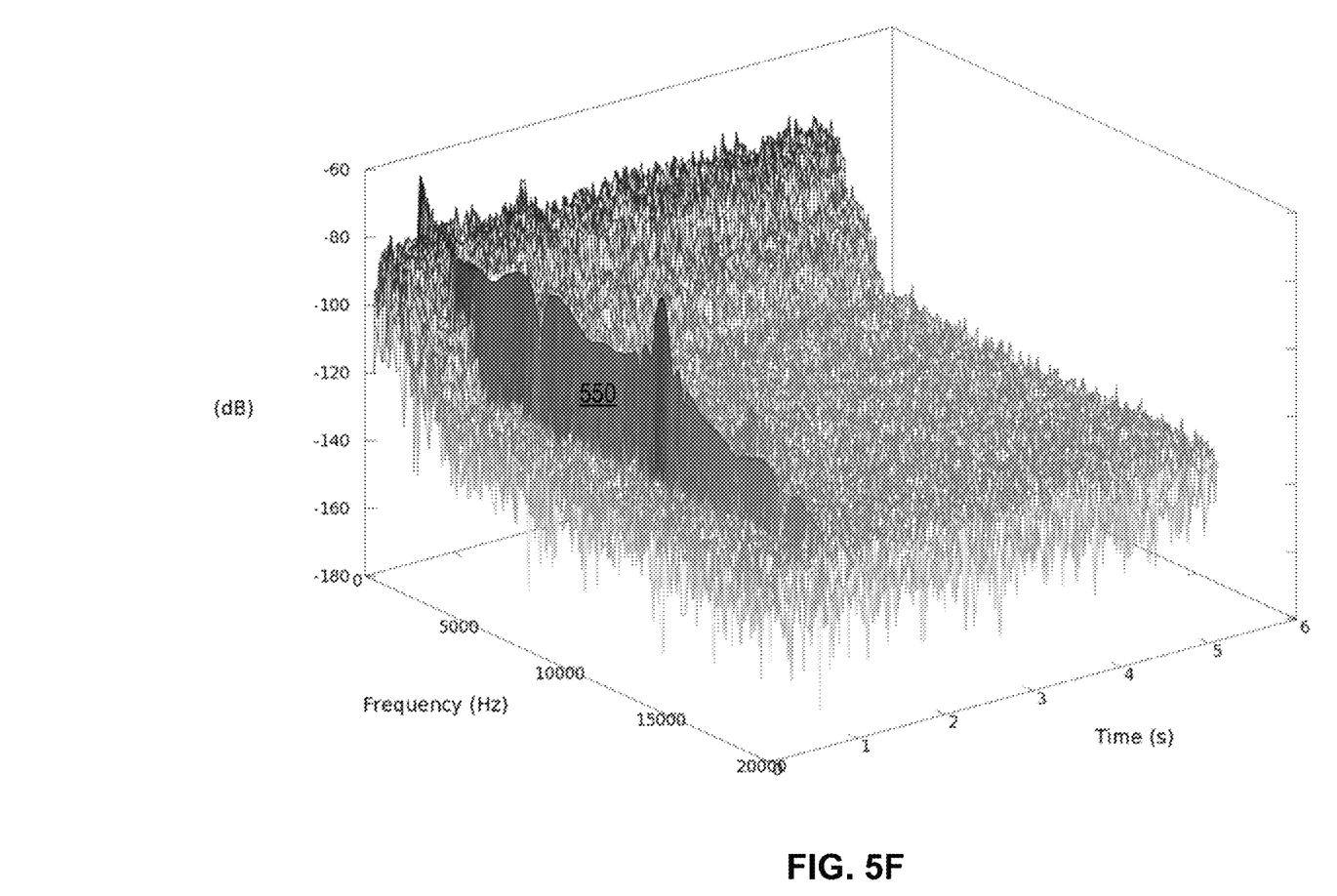

FIG. 5D illustrates the same 5-second audio signal after applying the nonlinear distortion operator to the upsampled audio signal shown in FIG. 5C and a subsequent low-pass filtering operation. Compared with the audio signals shown in FIGS. 5A to 5C, the audio signal in FIG. 5D includes more outstanding spikes. In particular, except for the three spikes 540-1, 540-3, and 540-5 that correspond to the three spikes shown in the other figures, one skilled in the art can identify more spikes such as 540-7 and 540-9 in the time sequence shown in FIG. 5D. FIG. 5F depicts the 3D spectrogram of the distorted audio signal. Compared with the 3D spectrum shown in FIG. 5E, the 3D spectrogram of the distorted audio signal at the time corresponding to the spike 540-1 has a broad spectrum of high-frequency components introduced into the audio signal by the nonlinear distortion operator. This phenomenon is consistent with the fact that the spike 540-1 in FIG. 5D is "elevated" relative to the other spikes (e.g., due to operation of the nonlinear distortion operator) when compared with the same set of spikes in the raw audio signal shown FIG. 5A. When this time sequence is played through a channel of a stereo or multi-channel speaker system, these spike-like signals produce crack-like sounds. If multiple time sequences like the one shown in FIG. 5D are played together through multiple channels of the stereo or multi-channel speaker system, a listener of the audio signals can estimate the spatial locations of the crack-like sounds in the underground earth. By correlating the spatial locations of the crack-like sounds in the underground earth with natural gas recovery rates, it is possible for an operator of the hydrofracking equipment to steer the drill bit in a direction that induces an increased number of cracks and therefore produces fossil fuel, such as natural gas.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:
1. A method of processing an audio signal, comprising:
  receiving the audio signal, the audio signal comprising an audio signal detected by a geophone placed in a well for monitoring hydraulic fracturing, wherein the audio signal is received in accordance with a sampling rate and has a cutoff frequency defined by the sampling rate;
  compressing a dynamic amplitude range of the audio signal in accordance with a predefined ratio;

modifying the compressed audio signal using a nonlinear distortion operator to generate a modified audio signal, wherein the modified audio signal has high frequency audible components not present in the received audio signal, comprising audible components introduced by the nonlinear distortion operator in a predefined frequency range above the cutoff frequency defined by the sampling rate of the received audio signal; and sending the modified audio signal to an output configured for connection to a stereo or multi-channel speaker system, wherein a user of the stereo or multi-channel speaker system is able to determine the locations of the microseismic events from listening to the modified audio signals.

2. The method of claim 1, further comprising:
before modifying the compressed audio signal:
upsampling the audio signal using an upsampling operator; and
filtering the upsampled audio signal using a first low-pass filter.

3. The method of claim 2, wherein the first low-pass filter is a second-order Butterworth low-pass filter that has a cutoff frequency determined by a sampling rate of the audio signal by the geophone.

4. The method of claim 2, wherein the audio signal has a sampling rate in the range 2 kHz to 8 kHz before the upsampling and a sampling rate in the range of 20 kHz to 100 kHz after the upsampling.

5. The method of claim 2, further comprising:
after modifying the compressed audio signal:
filtering the modified audio signal using a second low-pass filter; and
providing the filtered audio signal to a predefined channel of an audio play device.

6. The method of claim 5, wherein the second low-pass filter is a second-order Butterworth low-pass filter that has a cutoff frequency determined by a sampling rate of the audio signal after the upsampling, wherein the upsampling operator is linear interpolation.

7. The method of claim 1, wherein the nonlinear distortion operator is a logistic map function.

8. The method of claim 1, wherein the dynamic amplitude range of the audio signal is compressed through an upward dynamic range compression scheme.

9. The method of claim 1, wherein the dynamic amplitude range of the audio signal is compressed through a downward dynamic range compression scheme.

10. A method of determining locations of microseismic events caused by a hydrofracking process, the method comprising:
measuring audio signals using an array of geophones deployed in a monitoring well during hydraulic fracturing, wherein the audio signals are measured in accordance with a sampling rate and have a cutoff frequency defined by the sampling rate;
modifying the audio signals according to a predefined nonlinear distortion operator to generate a modified audio signal, wherein the modified audio signal has high frequency audible components not present in the measured audio signals, comprising audible components introduced by the nonlinear distortion operator in a predefined frequency range above the cutoff frequency defined by the sampling rate of the measured audio signals; and
playing the modified audio signals through a stereo or multi-channel speaker system, wherein a user of the stereo or multi-channel speaker system is able to determine the locations of the microseismic events from listening to the modified audio signals.

11. The method of claim 10, further comprising:
the user listening to the modified audio signals and steering the hydrofracking equipment, in response to the user listening to the modified audio signals, in a direction such that more rock cracks are induced, thereby increasing a rate of extracting fossil fuels using the hydrofracking process.

12. The method of claim 10, further comprising:
before modifying a respective audio signal:
compressing a dynamic amplitude range of the audio signal in accordance with a predefined ratio;
upsampling the audio signal using an upsampling operator; and
filtering the upsampled audio signal using a first low-pass filter.

13. The method of claim 12, wherein the dynamic amplitude range of the audio signal is compressed through an upward dynamic range compression scheme.

14. The method of claim 12, wherein the dynamic amplitude range of the audio signal is compressed through a downward dynamic range compression scheme.

15. The method of claim 12, wherein the first low-pass filter is a second-order Butterworth low-pass filter that has a cutoff frequency determined by a sampling rate of the audio signal by the geophone.

16. The method of claim 12, wherein the audio signal has a sampling rate in the range of 2 kHz to 8 kHz before the upsampling and a sampling rate in the range of 20 kHz to 100 kHz after the upsampling.

17. The method of claim 10, wherein modifying the audio signals according to the predefined nonlinear distortion operator further comprises:
filtering the modified audio signals using a second low-pass filter; and
providing each of the filtered audio signals to a respective channel of the stereo or multi-channel speaker system.

18. The method of claim 17, wherein the second low-pass filter is a second-order Butterworth low-pass filter that has a cutoff frequency determined by a sampling rate of the audio signal after the upsampling, wherein the upsampling operator is linear interpolation.

19. The method of claim 10, wherein the predefined nonlinear distortion operator is a logistic map function.

20. A computer server system for determining locations of microseismic events caused by a hydrofracking process, comprising:
one or more processors;
memory; and
a plurality of program modules, wherein the plurality of program modules are stored in the memory and to be executed by the one or more processors, and the plurality of program modules include instructions for:
measuring audio signals using an array of geophones deployed in a monitoring well during hydraulic fracturing, wherein the audio signals are measured in accordance with a sampling rate and have a cutoff frequency defined by the sampling rate;
modifying the audio signals according to a predefined nonlinear distortion operator to generate a modified audio signal, wherein the modified audio signal has high frequency audible components not present in the measured audio signals, comprising audible components introduced by the nonlinear distortion operator in a predefined frequency range above the cutoff frequency defined by the sampling rate of the measured audio signals; and playing the modified audio signals through a stereo or multi-channel speaker system, wherein a user of the stereo or multi-channel speaker system is able to determine the locations of the microseismic events from listening to the modified audio signals.

21. A non-transitory computer readable storage medium storing one or more program modules configured for execution by a computer server system that includes one or more processors and memory for determining locations of microseismic events caused by a hydrofracking process, the one or more program modules comprising instructions for:

measuring audio signals using an array of geophones deployed in a monitoring well during hydraulic fracturing, wherein the audio signals are measured in accordance with a sampling rate and have a cutoff frequency defined by the sampling rate;

modifying the audio signals according to a predefined nonlinear distortion operator to generate a modified audio signal, wherein the modified audio signal has high frequency audible components not present in the measured audio signals, comprising audible components introduced by the nonlinear distortion operator in a predefined frequency range above the cutoff frequency defined by the sampling rate of the measured audio signals; and playing the modified audio signals through a stereo or multi-channel speaker system, wherein a user of the stereo or multi-channel speaker system is able to determine the locations of the microseismic events from listening to the modified audio signals.

* * * * *